(12) United States Patent
Yoo et al.

(10) Patent No.: US 11,558,562 B2
(45) Date of Patent: Jan. 17, 2023

(54) APPARATUS AND METHOD FOR PROVIDING 360-DEGREE PANORAMIC BACKGROUND DURING VIDEO CALL

(71) Applicant: LINE Plus Corporation, Seongnam-si (KR)

(72) Inventors: Jinhee Yoo, Seongnam-si (KR); Ji Seon Choi, Seongnam-si (KR); Chihoon Ryu, Seongnam-si (KR); Seong Ran Seo, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 17/007,419

(22) Filed: Aug. 31, 2020

(65) Prior Publication Data

US 2021/0075977 A1 Mar. 11, 2021

(30) Foreign Application Priority Data

Sep. 6, 2019 (KR) .................. 10-2019-0110639
Oct. 22, 2019 (KR) .................. 10-2019-0131239

(51) Int. Cl.
*H04N 5/272* (2006.01)
*H04N 7/15* (2006.01)
*H04N 5/232* (2006.01)

(52) U.S. Cl.
CPC ......... *H04N 5/272* (2013.01); *H04N 5/23238* (2013.01); *H04N 7/152* (2013.01); *H04N 7/157* (2013.01)

(58) Field of Classification Search
CPC .......... H04N 7/15; H04N 7/147; H04N 5/272; H04N 5/232
USPC ........ 348/14.08, 36, 143, 148, 239, E07.043
See application file for complete search history.

(56) References Cited

U.S. PATENT DOCUMENTS 10,277,813 B1 * 4/2019 Thomas ............. H04N 5/23206
2016/0050368 A1 * 2/2016 Seo .......................... G06T 7/174
348/36

* cited by examiner

*Primary Examiner* — Yosef K Laekemariam
(74) *Attorney, Agent, or Firm* — Harness, Dickey & Pierce P.L.C.

(57) ABSTRACT

Disclosed is a method and apparatus for providing a 360-degree panoramic background during a video call. A non-transitory computer-readable recording medium stores instructions that, when executed by a processor, cause the processor to perform operations for providing a background on an electronic device. The operations include separating an object video and an original background video from video data input to a first video call screen of an electronic device during a video call; generating new video data by synthesizing a panoramic video image and the object video such that the new video data includes the object video and includes the panoramic video image as a replacement background video; and displaying, on the first video call screen, the new video data such that a location of the panoramic video image of the new video data moves in response to motion information of a user.

18 Claims, 14 Drawing Sheets

APPARATUS AND METHOD FOR PROVIDING 360-DEGREE PANORAMIC BACKGROUND DURING VIDEO CALL

This U.S. non-provisional application and claims the benefit of priority under 35 U.S.C. § 119 to Korean Patent Application No. 10-2019-0110639, filed Sep. 6, 2019, and Korean Patent Application No. 10-2019-0131239, filed Oct. 22, 2019 the entire contents of each of which are incorporated herein by reference in their entirety.

BACKGROUND

Field

One or more example embodiments relate to technology for providing an available background during a video call between electronic devices.

Related Art

In general, there is an issue for invasion of privacy since information corresponding to personal privacy, for example, a place, a location, or a surrounding environment where a user makes a call, is transmitted to a counterpart user during a video call. Therefore, studies are being made to modulate a background video to protect the privacy of the user using the video call. For example, provided are a video deletion form of removing a video part from a video call and transmitting only an audio part, a method of replacing a background video with a specific video on the Internet or through a separate video conversion server, and the like.

If a camera application (app) or a video call app provides a background sticker to select various types of backgrounds, a user may change a background by selecting a desired background sticker. However, the conventional background sticker may provide a monotonous monochromatic background or may not completely remove a background during a process of separating a background and a subject, for example, a person. Accordingly, there is a need for technology that may allow a user not desiring to expose a location of the user to completely obscure a background and may provide a sense of reality and a story beyond such a monotonous sticker pattern.

SUMMARY

Example embodiments provide a method and apparatus that may replace a background video with a 360-degree panoramic video image in video data input to a video call screen during a video call and may display, on the video call screen, new video data that is generated by synthesizing the background video replaced with the panoramic video image with an object video.

According to at least one example embodiment, a non-transitory computer-readable recording medium stores instructions that, when executed by a processor, cause the processor to perform operations for providing a background on an electronic device. The operations include separating an object video and an original background video from video data input to a first video call screen of an electronic device during a video call; generating new video data by synthesizing a panoramic video image and the object video such that the new video data includes the object video and includes the panoramic video image as a replacement background video; and displaying, on the first video call screen, the new video data such that a location of the panoramic video image of the new video data moves in response to motion information of a user.

The operations may further include causing a second video call screen of a counterpart terminal to display the new video data displayed on the first video call screen by sharing the new video data.

The sharing may include transmitting the panoramic video image included as the replacement background video of the new video data displayed on the first video call screen to the counterpart terminal with which the video call is ongoing.

The sharing may include controlling the new video data including the panoramic video image as the replacement background video of the new video data to be displayed on the second video call screen of the counterpart terminal based on time information set to maintain the replacement background video.

The sharing may include setting, to the panoramic video image, location information for displaying an object video captured through a camera of the counterpart terminal and input to the first video call screen; and transmitting the panoramic video image including the set location information to the counterpart terminal.

The sharing may include transmitting, based on time information, the replacement background video including the time information to the counterpart terminal to cause the counterpart terminal to display the replacement background video on the second video call screen of the counterpart terminal based on time difference information indicating a difference between a time indicated by the time information and a time at which the replacement background video is received at the counterpart terminal.

The sharing may include triggering an event in a background object present in the panoramic video image based on interaction information.

The sharing may include triggering an event as an item is arranged in a partial area of the panoramic video image and interaction information is input to the item that is arranged in the partial area of the panoramic video image moving in response to motion information of the user.

The motion information may include orientation information about at least one of up, down, left, and right of the electronic device.

The displaying may include playing background music set to the panoramic video image.

The generating may include retrieving the panoramic video image from memory of the electronic device; and replacing the original background video with the panoramic video image.

The generating may include generating the panoramic video image by using at least one image captured by the electronic device; and replacing the original background video with the generated panoramic video image.

The generating may include providing a background video list; receiving a selection of the panoramic video image from the background video list; and replacing the original background video with the panoramic video image selected from the provided background video list.

According to at least some example embodiments, a background providing method performed by an electronic device includes separating an object video and an original background video from video data input to a first video call screen of an electronic device during a video call; generating new video data by synthesizing a panoramic video image and the object video such that the new video data includes the object video and includes the panoramic video image as a replacement background video; and displaying, on the first video call screen, the new video data such that a location of the panoramic video image of the new video data moves in response to motion information of a user.

The background providing method may further include causing a second video call screen of a counterpart terminal to display the new video data displayed on the first video call screen by sharing the new video data.

16. The background providing method may further include controlling the new video data including the panoramic video image as the replacement background video of the new video data to be displayed on the second video call screen of the counterpart terminal based on time information set to maintain the replacement background video.

The sharing may include setting, to the panoramic video image, location information for displaying an object video captured through a camera of the counterpart terminal and input to the first video call screen; and transmitting the panoramic video image including the set location information to the counterpart terminal.

According to at least some example embodiments, an electronic device includes memory storing computer-executable instructions; and one or more processors configured to execute the computer-executable instructions such that the electronic device is configured to perform operations including separating an object video and an original background video from video data input to a first video call screen of an electronic device during a video call; generating new video data by synthesizing a panoramic video image and the object video such that the new video data includes the object video and includes the panoramic video image as a replacement background video; and displaying, on the first video call screen, the new video data such that a location of the panoramic video image of the new video data moves in response to motion information of a user.

The one or more processors may be configured to execute the computer-executable instructions such that the electronic device is further configured to cause a second video call screen of a counterpart terminal to display the new video data displayed on the first video call screen by sharing the new video data, and the sharing may include transmitting, based on time information, the replacement background video including the time information to the counterpart terminal to cause the counterpart terminal to display the replacement background video on the second video call screen of the counterpart terminal based on time difference information indicating a difference between a time indicated by the time information and a time at which the replacement background video is received at the counterpart terminal.

The one or more processors may be configured to execute the computer-executable instructions such that the electronic device is further configured to set whether the counterpart terminal is to receive the panoramic video image.

The received panoramic video image may be replaced with a background video of video data input through a camera of the counterpart terminal and the background video replaced with the panoramic video image may be displayed on the second video call screen of the counterpart terminal.

The received panoramic video image may be replaced with a background video of video data input through a camera of the counterpart terminal and the background video replaced with the panoramic video image may be displayed on the video call screen of the counterpart terminal.

According to some example embodiments, since a 360-degree panoramic video image is displayed as a background video of a video call screen, a user and a counterpart user may experience the vitality of being present in the same space.

Also, according to some example embodiments, since surrounding information of a user displayed on a video call screen during a video call is obscured, it is possible to protect privacy of the user.

Also, according to some example embodiments, a user may meet another person without a need to disclose a space of the user.

Further areas of applicability will become apparent from the description provided herein. The description and specific examples in this summary are intended for purposes of illustration only and are not intended to limit the scope of example embodiments of the present disclosure.

BRIEF DESCRIPTION OF DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
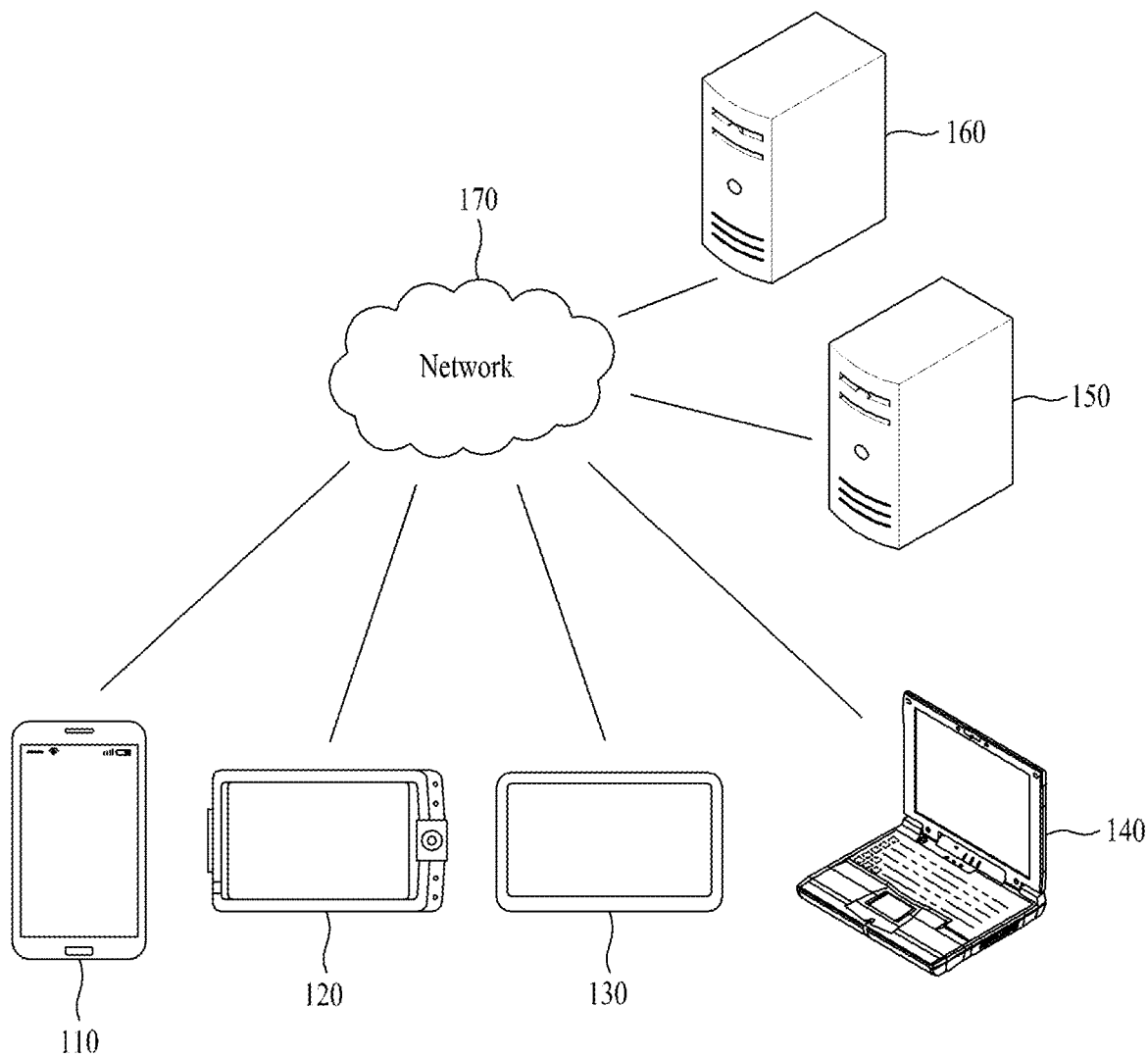
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, the server 150 may provide, as the first service, a service (e.g., a messaging service) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
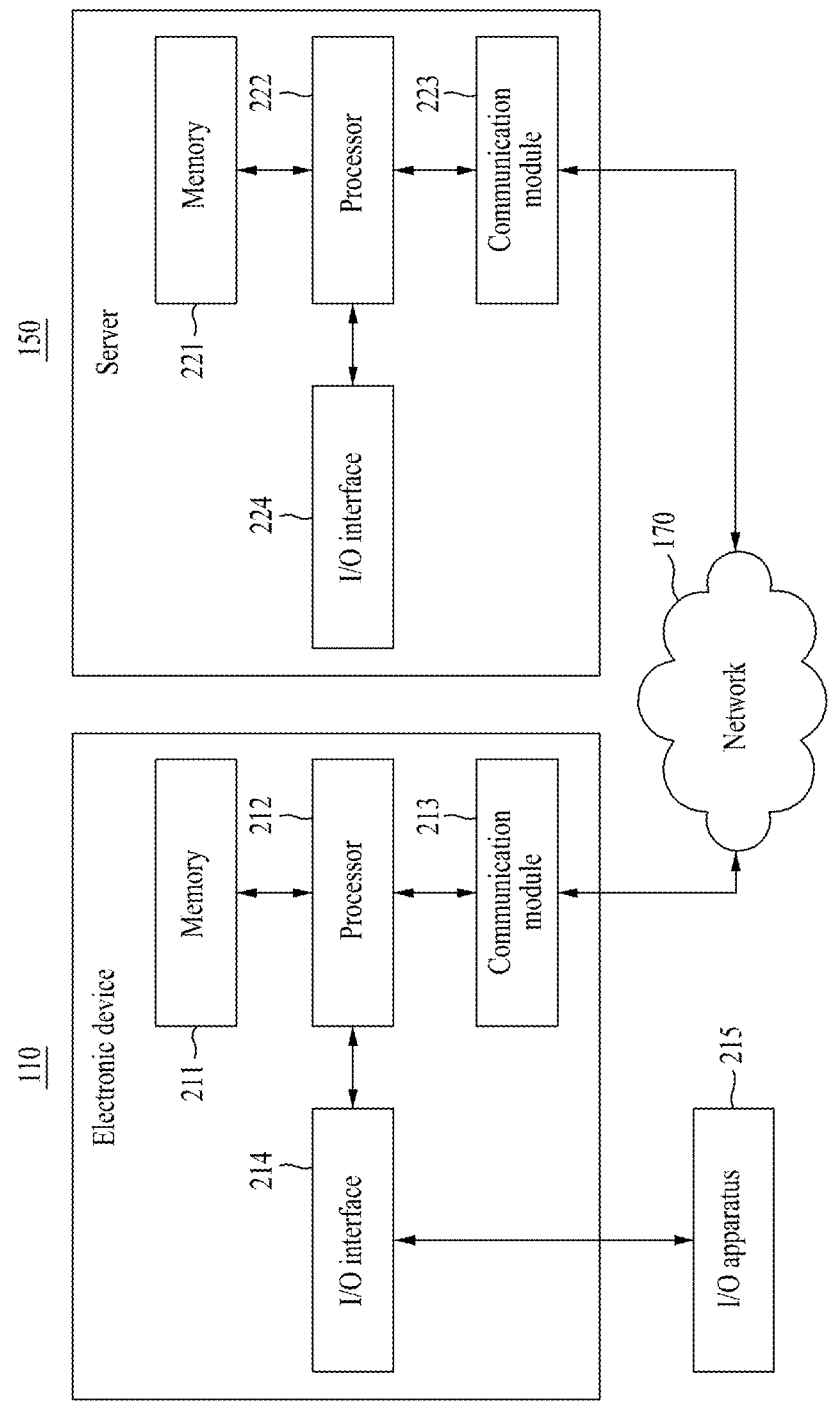
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and 140 or the server 160 may have the same or similar configuration as that of the electronic device 110 or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable recording medium. The permanent mass storage device, such as ROM, SSD, flash memory, and disk drive, may be included in the electronic device 110 or the server 150 as a permanent storage device separate from the memory 211, 221. Also, an OS and at least one program code, for example, a code for a browser installed and executed on the electronic device 110 or an application installed and executed on the electronic device 110 to provide a specific service, may be stored in the memory 211, 221. Such software components may be loaded from another non-transitory computer-readable recording medium separate from the memory 211, 221. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable recording medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. In detail, when the processor 212 of the electronic device 110 processes an instruction of a computer program loaded to the memory 211, content or a service screen configured based on data provided from the server 150 or the electronic device 120 may be displayed on the display through the I/O interface 214.

According to other example embodiments, the electronic device 110 and the server 150 may include a smaller or greater number of components than a number of components shown in FIG. 2. However, there is no need to clearly illustrate many components according to the related art. For example, the electronic device 110 may include at least a portion of the I/O apparatus 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, an example embodiment of separating video data input during a video call into an object video and a background video, replacing the separated background video with a wide viewing angle video, and displaying the same on a video call screen is described. Also, an example embodiment of sharing a wide viewing angle video included in a background video of video data displayed on a video call screen with a counterpart terminal with which a video call is ongoing is described. Here, the term "wide viewing angle" may represent a maximum side angle at which a normal screen is visible on the video call screen. A wide viewing angle video with a normal brightness may be viewed on the video call screen in an angle range including up, down, left, and right. As an example of the wide viewing angle video, a panoramic video image may apply. The panoramic video image may provide a video or an image in a panoramic form. For example, a single point of the video or the image may be viewed in various directions, for example, 360 degrees.

The electronic device 110 according to an example embodiment may be configured using a background providing system implemented as a computer. For example, the background providing system may be configured in a form of a program that independently operates or in an in-app form of a specific application to be operable on the specific application. Depending on example embodiments, the background providing system may provide a background providing service through interaction with the server 150.

The background providing system configured on the electronic device 110 may perform methods including at least one feature associated with the example embodiments in response to an instruction provided from an application installed on the electronic device 110.

In detail, the same background video may be displayed on video call screens of different electronic devices 110 by sharing the background video replaced with the panoramic video image during the video call. For example, original background video (e.g., a background portion of video data captured by a camera) may be replaced by the panoramic video image. The background video resulting from replacing the original background video with the panoramic video image may be referred to in the present specification as a "replacement background video" or a "background video replaced with a panoramic video image." Further, the term "original background video" is used in the present specification to refer to the background video that was replaced by the panoramic video image (i.e., the background video that existed before the aforementioned replacement). Accordingly, the replacement background video may be or include the panoramic video image with which the original background image is replaced. Hereinafter, the electronic devices 110 may be classified into a terminal and a counterpart terminal. In an example embodiment, a video call environment may be provided in such a manner that a video call is performed through call connection between a terminal, for example, a first terminal and a calling terminal, and a counterpart terminal, for example, a second terminal and a receiving terminal. Here, a background video replaced with a panoramic video image may be shared through a background providing service provided in the video call environment. Here, the background providing service may be provided as a primary function or a secondary function, in various services, for example, a unique video call service, camera service, and chat service of the electronic device 110.

In response to a selection on a user interface, for example, a sticker tab, for replacing the original background video on the electronic device 110, a sticker for replacing the original background video with a panoramic video image may be applied. For example, a background video list for replacing an original background video may be provided from the background providing service that operates on the electronic device 110. In response to a selection on a background video sticker from the provided background video list, an original background video may be replaced with a panoramic video image by verifying stickered background video applied and non-applied video data. Hereinafter, technology for providing a background sticker available while performing a video call with a counterpart terminal is described.

Figure 3:
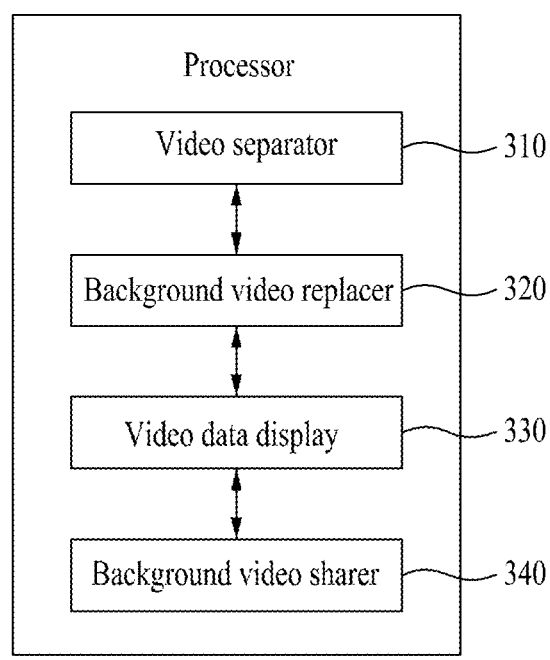
FIG. 3 is a diagram illustrating an example of components includable in a processor of an electronic device according to at least one example embodiment.
Figure 4:
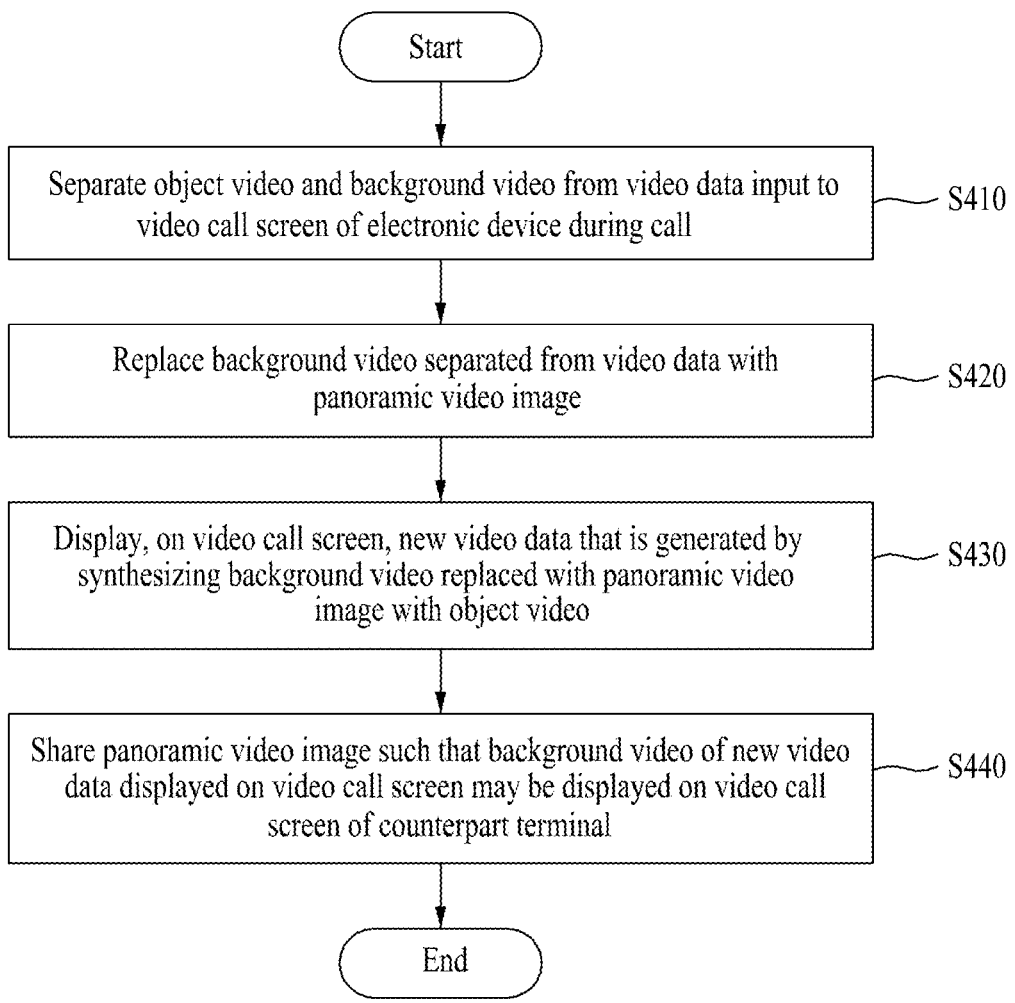
FIG. 4 is a flowchart illustrating an example of a background providing method performed by an electronic device according to at least one example embodiment.

FIG. 3 is a diagram illustrating an example of components includable in a processor of an electronic device according to at least one example embodiment, and FIG. 4 is a flowchart illustrating an example of a background providing method performed by an electronic device according to at least one example embodiment.

Referring to FIG. 3, the processor 212 of the electronic device 110 may include a video separator 310, a background video replacer 320, a video data display 330, and a background video sharer 340. Such components of the processor 212 may be representations of different functions performed by the processor 212 in response to a control instruction provided from a program code stored in the electronic device 110 (e.g., in memory of the electronic device 110). The processor 212 and the components of the processor 212 may control the electronic device 110 to perform operations S410 to S440 included in the background providing method of FIG. 4. Here, the processor 212 and the components of the processor 212 may be configured to execute an instruction according to a code of at least one program and a code of an OS included in the memory 211.

The processor 212 may load, to the memory 211, a program code stored in a file of a program for the background providing method. For example, in response to an execution of a program on the electronic device 110, the processor 212 may control the electronic device 110 to load the program code from the file of the program to the memory 211 under control of an OS. Here, the processor 212 and the video separator 310, the background video replacer 320, the video data display 330, and the background video sharer 340 included in the processor 212 may be different functional representations of the processor 212 to perform the following operations S410 to S440 by executing an instruction of a part corresponding to the program code loaded to the memory 211.

According to at least some example embodiments, the electronic device 110 and/or elements of the electronic device 110 (e.g., the processor 212) may be or include processing circuitry such as hardware including logic circuits; a hardware/software combination executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, an application-specific integrated circuit (ASIC), etc.

Figure 5:
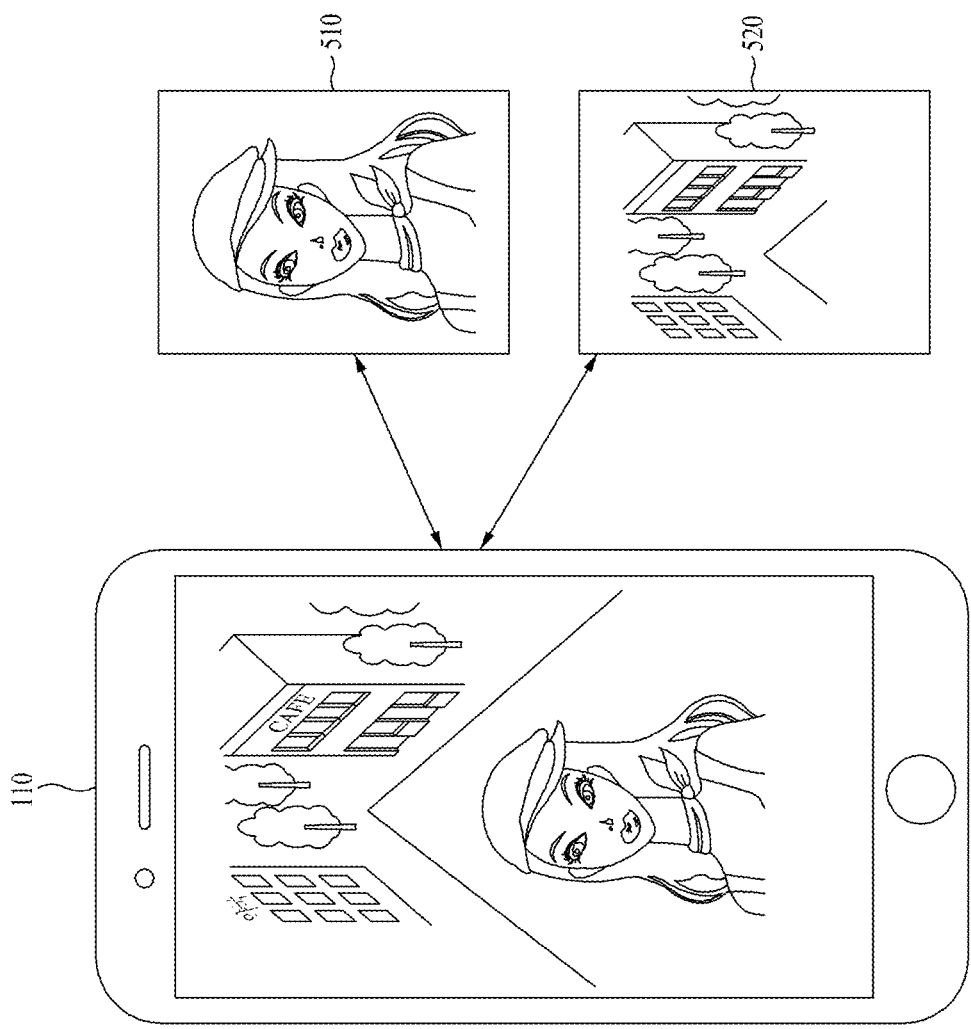
FIG. 5 illustrates an example of separating, by an electronic device, video data input during a video call into an object video and a background video according to at least one example embodiment.

Referring to FIG. 4, in operation S410, the video separator 310 may separate an object video and a background video (e.g., an original background video) from video data input to a video call screen of an electronic device 110 during a video call. FIG. 5 illustrates an example of separating an object video and a background video from video data according to at least one example embodiment. A front camera mode may operate in response to executing a camera on the electronic device 110. The video data input through the camera of the electronic device 110 may include an object video 510 including information of a user, for example, a face of the user, and a background video 520 including user surrounding information, for example, a building, a road, and people irrelevant to the user. Here, although the front camera mode is described as an example for a camera mode that operates in the electronic device 110 during a video call, it is provided as an example only. A rear camera mode may also apply in the aforementioned manner. The front camera mode or the rear camera mode may operate in response to a selection of the user. For example, the video separator 310 may separate the object video and the background video from the video data using a method of outlining the boundary of an object through an edge recognition for the video data, by grouping pointers within the boundary, and continuously growing as points having similar features around. In addition, the object video and the background video may be separated from the video data by applying various methods.

In operation S420, the background video replacer 320 may replace the background video separated from the video data with a panoramic video image. For example, the background video replacer 320 may replace the background video excluding the object video with the panoramic video image. For example, the background video replacer 320 may replace the background video with a panoramic video image stored in the electronic device 110, thereby generating a replacement background video. For example, operation S420 may include generating new video data by synthesizing a panoramic video image and the object video such that the new video data includes the object video and includes the panoramic video image as the replacement background video. The panoramic video image may be stored in advance in the electronic device 110. The background video replacer 320 may apply, as the background video, a panoramic video image selected to replace the background video from among at least one panoramic video image stored in the electronic device 110. As another example, the background video replacer 320 may generate a panoramic video image using at least one image acquired from the electronic device 110 and may replace the background video with the generated panoramic video image. Here, the background video replacer 320 may acquire, from the electronic device 110, a video or an image captured to generate the panoramic video image. Alternatively, the background video replacer 320 may acquire videos or images from the electronic device 110 by downloading the videos or the images uploaded from other electronic devices. For example, the background video replacer 320 may provide a user interface, for example, tool, capable of generating a panoramic video image using the images or the videos acquired from the electronic device 110, and may generate the panoramic video image by combining the images or the videos in response to a selection from the user using the provided user interface. The background video replacer 320 may replace the background video with the generated panoramic video image. As another example, the background video replacer 320 may provide a background video list for the background video and may replace the background video with a panoramic video image selected from the provided background video list. Here, the background video replacer 320 may display video data or a background video to which the panoramic video image selected from the user is applied. Once the user verifies the panoramic video image displayed on the video call screen of the electronic device 110, whether to apply the panoramic video image as the background video may be determined. When the panoramic video image is determined to be applied as the background video, the background video replacer 320 may apply the panoramic video image as the background video.

Figure 7:
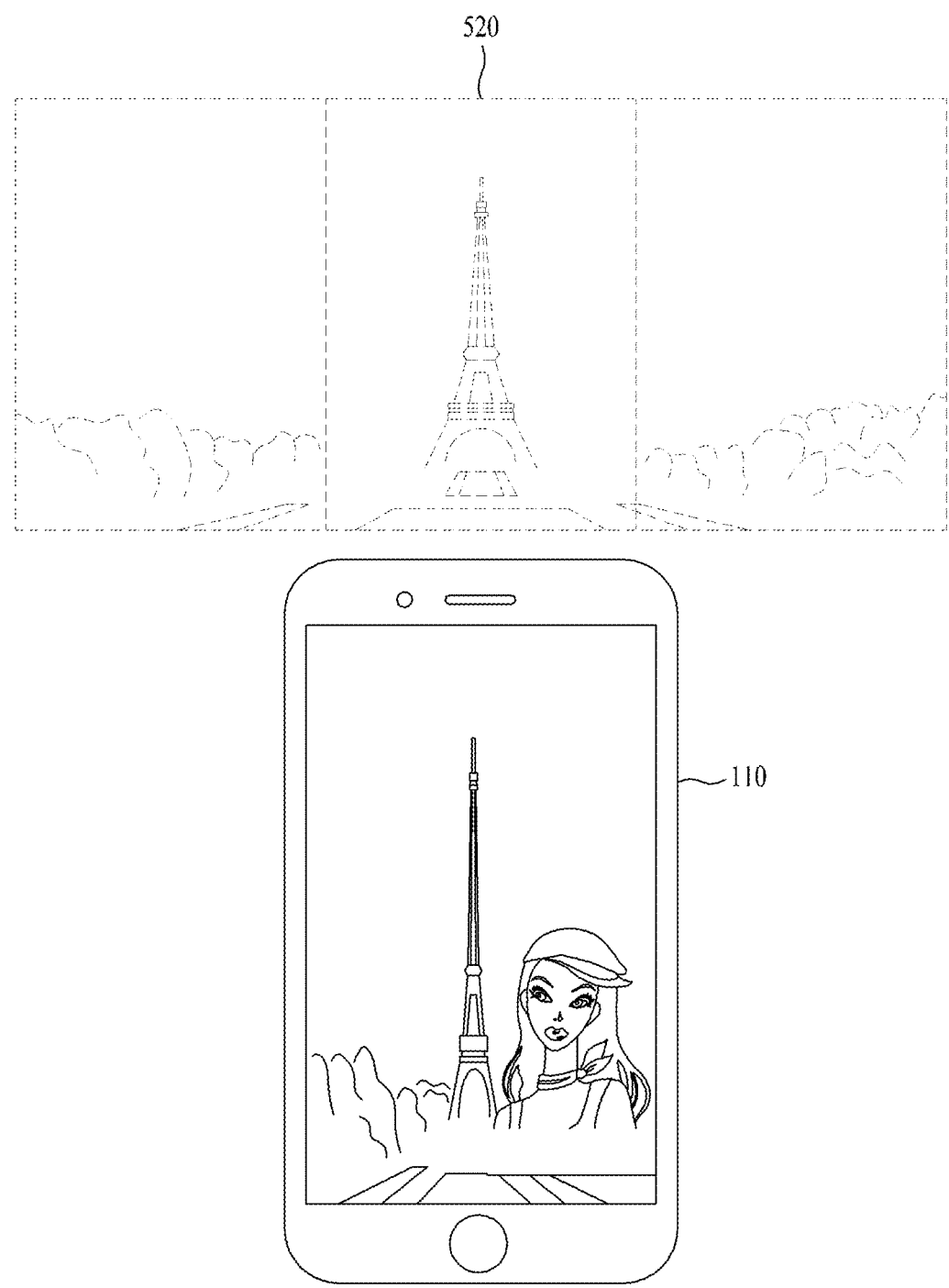
FIGS. 7 and 8 illustrate examples of displaying, by an electronic device, a background video replaced with a panoramic video image on a video call screen according to at least one example embodiment.
Figure 8:
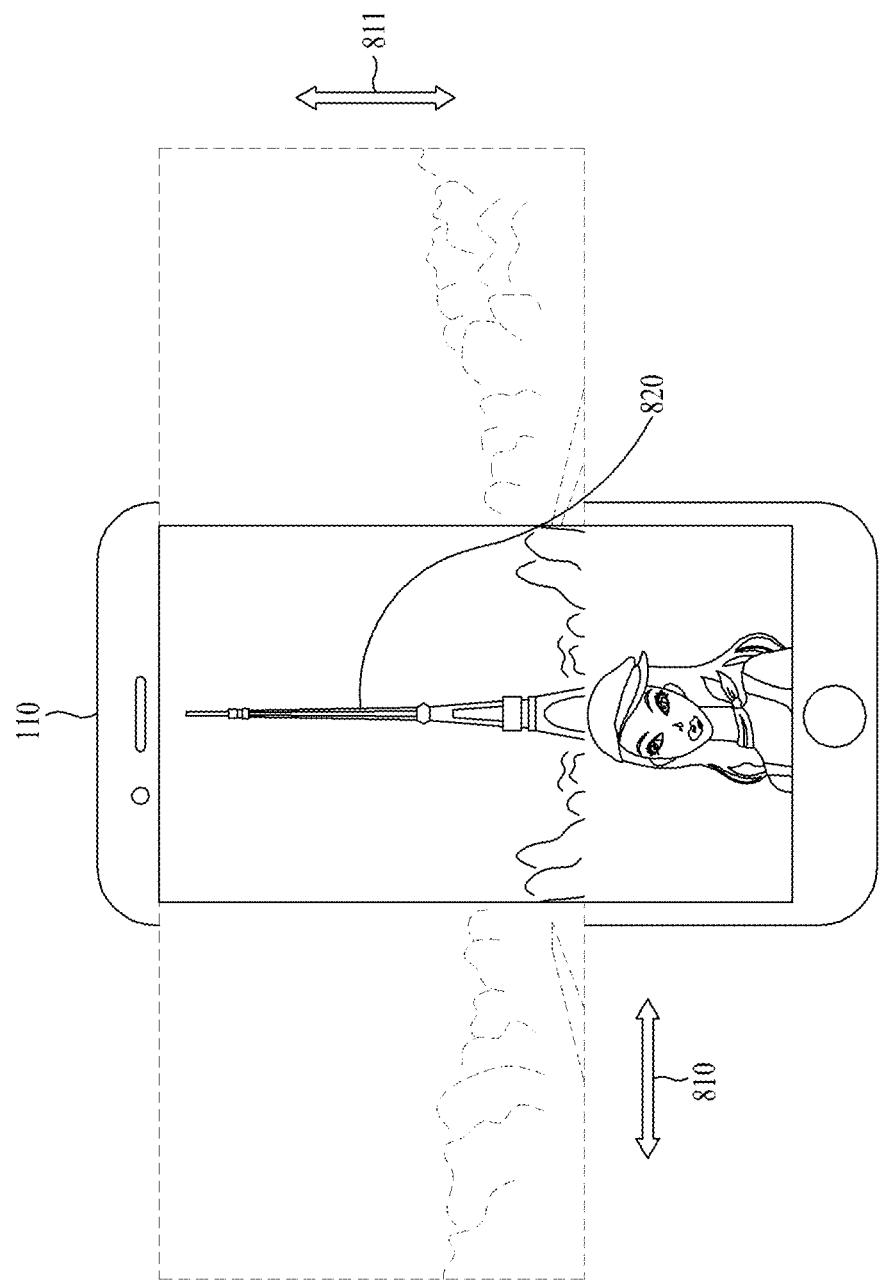

In operation S430, the video data display 330 may display, on the video call screen of the electronic device 110, new video data that is generated by synthesizing the background video replaced with the panoramic video image with the object video. For example, operation S430 may include displaying the new video data generated in operation S420 by synthesizing the panoramic video image and the object video, as is discussed above with respect to operation S420. FIGS. 7 and 8 illustrate examples of displaying a background video replaced with a panoramic video image on a video call screen according to at least one example embodiment. Referring to FIG. 7, the video data display 330 may display, on the video call screen of the electronic device 110, new video data that is generated by synthesizing an object video and a background video replaced with the panoramic video image 520. The new video data in which the background video is replaced with the panoramic video image 520 may be displayed on the electronic device 110 with the object video captured from the electronic device 110 being maintained. Here, the object video captured in real time through the camera operating in the electronic device 110 may be displayed as video data. The video data display 330 may display, on the video call screen of the electronic device 110, new video data that is generated by synthesizing the object video and the background video replaced with the panoramic video image 520 and, at the same time, play music. For example, when displaying new video data on the video call screen of the electronic device 110, the video data display 330 may play background music registered to the panoramic video image 520. Here, music to play with the panoramic video image 520 may be registered in advance. Alternatively, a music list to play with the panoramic video image 520 may be provided and music selected from the music list may be registered. Alternatively, music may be registered through user search for music to play with the panoramic video image 520. Also, volume of music may be adjusted.

Also, referring to FIG. 8, the video data display 330 may set, as a reference area, a partial area of a panoramic video image to be initially displayed on the video call screen. The video data display 330 may display, on the video call screen of the electronic device 110 as a background video, the reference area of the panoramic video image set to be initially displayed on the video call screen of the electronic device 110. The reference area may be changed in response to a setting of the user. The background video replaced with the panoramic video image may move in response to motion information 810, 811 of the user based on the reference area of the panoramic video image initially displayed on the video call screen of the electronic device 110. For example, the video data display 330 may display a background video corresponding to at least one piece of the motion information 810 and 811 that includes orientation information including up, down, left, and right, input from the user. Also, a background object, for example, a landmark 820, may be included in the background video replaced with the panoramic video image of the new video data displayed on the video call screen of the electronic device 110. Here, the landmark 820 may refer to an object present in the panoramic video image. An item arranged in a space within the panoramic video image or the landmark 820 may be set to trigger an event. For example, with the assumption that the panoramic video image includes Eiffel Tower of Paris, an item may be arranged in advance in Eiffel Tower of Paris or around Eiffel tower in the panoramic video image. Here, the item present in Eiffel Tower or around Eiffel Tower may be acquired by illuminating Eiffel Tower or surroundings of Eiffel Tower in the background video moving in response to a motion of the user through new video data displayed on the electronic device 110. Alternatively, the event may be triggered in response to interaction information input to Eiffel Tower or around Eiffel Tower. For example, various types of events may be triggered based on interaction information input from the user to Eiffel Tower.

Figure 6:
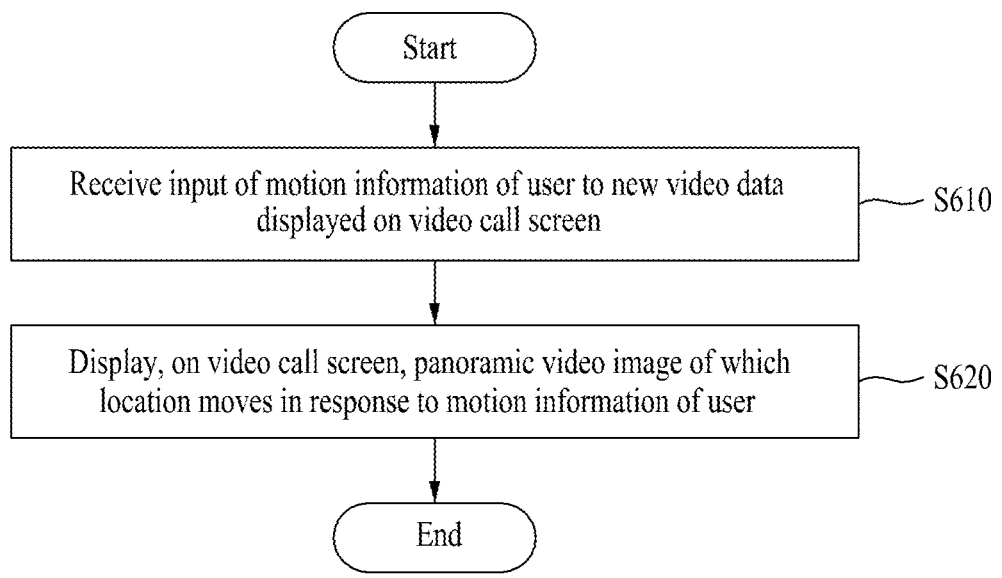
FIG. 6 is a flowchart illustrating an example of a method of displaying, by an electronic device, a background video of a video call screen of which a location moves based on motion information according to at least one example embodiment.

FIG. 6 illustrates an example of a method of displaying, on a video call screen, a background video of which a location moves based on motion information of a user according to at least one example embodiment. Referring to FIG. 6, in operation S610, the video data display 330 may receive an input of motion information of the user to new video data displayed on the video call screen. For example, orientation information including up, down, left, and right may be input as motion information of the user. In operation S620, the video data display 330 may display, on the video call screen, a panoramic video image of which a location moves in response to the motion information of the user. For example, the video data display 330 may display a 360-degree panoramic video image as a background video in response to a left-to-right 360-degree movement from the user.

In operation S440, the background video sharer 340 may share the panoramic video image such that a background video of new video data displayed on the video call screen of the electronic device 110 may be displayed on a video call screen of a counterpart terminal. Here, the background video sharer 340 may operate a panoramic video image sharing process in response to a request for sharing the panoramic video image. The background video sharer 340 may transmit the panoramic video image included in the background video of the new video data displayed on the video call screen to the counterpart terminal with which the video call is ongoing. For example, if the video call is ongoing with a plurality of counterpart terminals, the background video sharer 340 may transmit the panoramic video image to each of the plurality of counterpart terminals. Here, whether to receive the panoramic video image included in the background video may be set as ON or OFF to a corresponding counterpart terminal. If ON is set to the counterpart terminal, the counterpart terminal may receive the panoramic video image and the received panoramic video image may replace a background video and may be displayed as video data. Also, if OFF is set to the counterpart terminal, the counterpart terminal may not receive the panoramic video image and the panoramic video image may not replace the background video.

Figure 9:
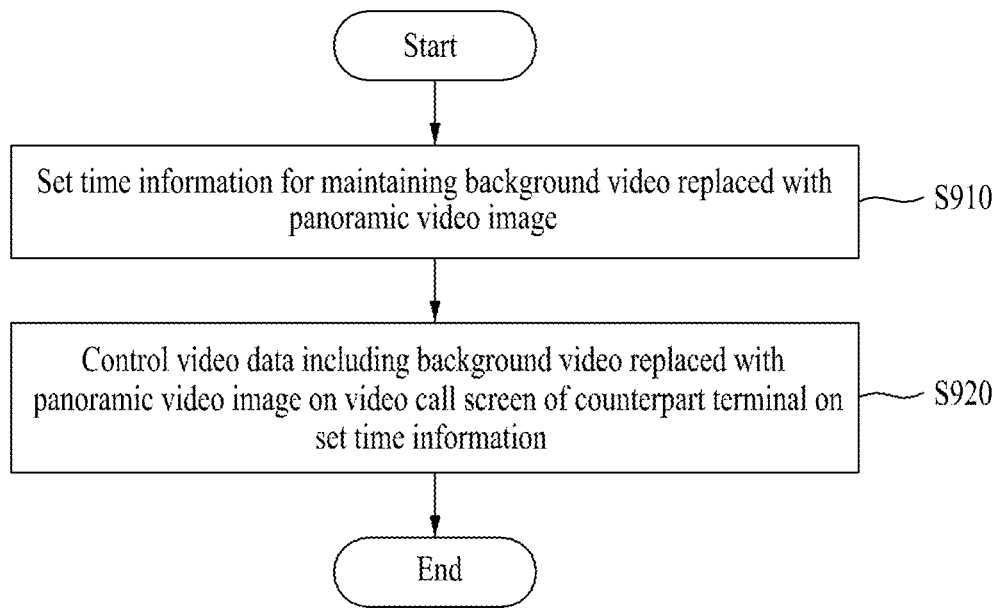
FIG. 9 is a flowchart illustrating an example of a method of controlling, by an electronic device, a background video of a counterpart terminal based on set time information according to at least one example embodiment.

FIG. 9 is a flowchart illustrating an example of a method of controlling a background video of a counterpart terminal based on set time information according to at least one example embodiment. Referring to FIG. 9, in operation S910, the background video sharer 340 may set time information, for example, 5 seconds, for maintaining a background video replaced with a panoramic video image. The background video sharer 340 may provide a user interface of setting time information for maintaining the background video and may trigger a lock function based on the time information input through the provided user interface. For example, the background video sharer 340 may set the lock function in a counterpart terminal to prevent the background video from being changed or not applied in the counterpart terminal during a preset period of time. During the period of time in which the lock function is set, the counterpart terminal may not change or delete the background video and may not suspend or terminate the video call. Therefore, the terminal may invite the counterpart terminal to the same space.

Figure 10:
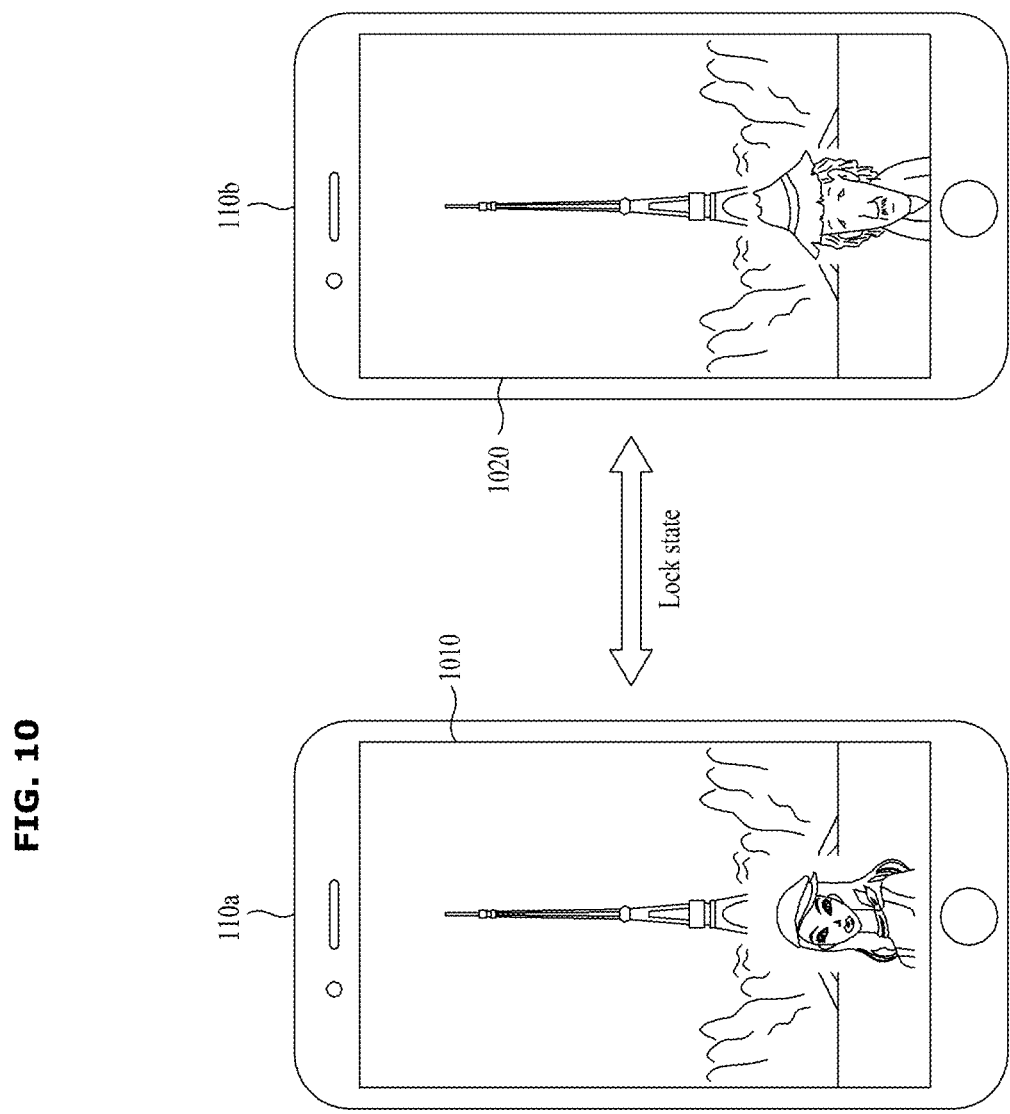
FIG. 10 illustrates an example of maintaining, by an electronic device, a background video of a counterpart terminal based on set time information according to at least one example embodiment.

In operation S920, the background video sharer 340 may control video data including the background video replaced with the panoramic video image to be displayed on a video call screen of the counterpart terminal based on the set time information. The background video sharer 340 may transmit, to the counterpart terminal, the panoramic video image of which a location moves in response to motion information of the user. Therefore, a location of the panoramic video image to be displayed on the video call screen of the counterpart terminal may move. FIG. 10 illustrates an example of maintaining a background video of a counterpart terminal based on time information set by a terminal according to at least one example embodiment. Here, it is assumed that a video call is ongoing between a terminal 110a and a counterpart terminal 110b. Here, during a time set by the terminal 110a, a panoramic video image that is a replacement background video displayed on a video call screen 1010 of the terminal 110a may be transmitted to the counterpart terminal 110b. Although the counterpart terminal 110b is using another background video, the counterpart terminal 110b may receive the background video that is replaced with the panoramic video image of the terminal 110a. The background video of video data displayed on a video call screen 1020 of the counterpart terminal 110b may be converted to the panoramic video image transmitted from the terminal 110a. Therefore, the same background video may be displayed on the video call screen 1010 of the terminal 110a and the video call screen 1020 of the counterpart terminal 110b.

Figure 11:
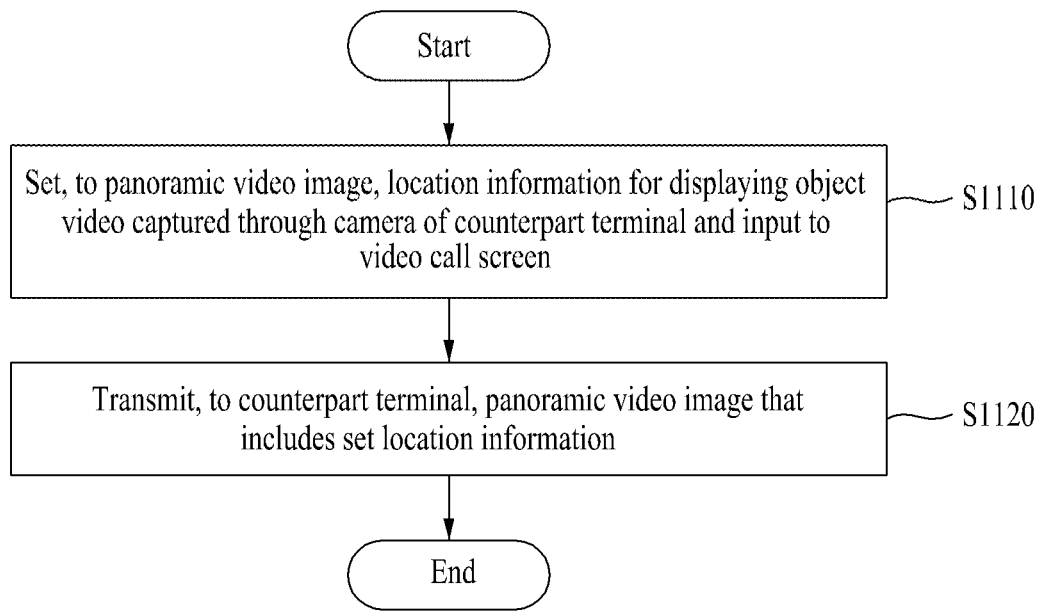
FIG. 11 is a flowchart illustrating an example of a method of setting, by an electronic device, location information for displaying an object video according to at least one example embodiment.
Figure 12:
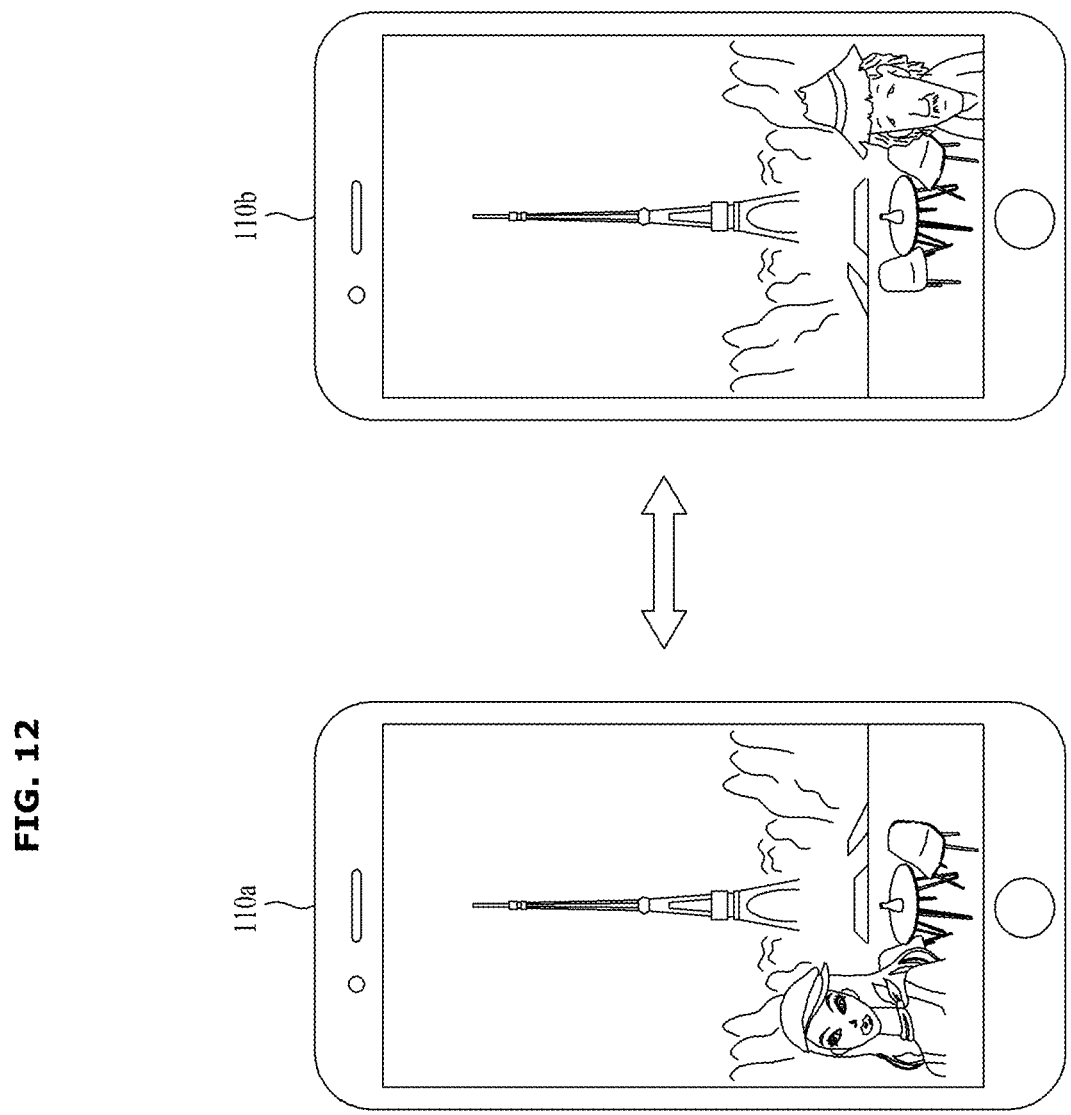
FIG. 12 illustrates an example of locating, by an electronic device, an object video based on set location information according to at least one example embodiment.

FIG. 11 is a flowchart illustrating an example of a method of setting location information at which an object video is displayed according to at least one example embodiment. Referring to FIG. 11, in operation S1110, the background video sharer 340 may set, to a panoramic video image, location information for displaying an object video captured through a camera of a counterpart terminal and input to a video call screen of an electronic device (e.g., terminal 110a). For example, the background video sharer 340 may receive a selection from the user on a specific point of the panoramic video image. Here, a specific point for displaying an object present in an object video of each of the terminal and the counterpart terminal may be selected. For example, a point for displaying a face of the user may be selected. In operation S1120, the background video sharer 340 may transmit, to the counterpart terminal, the panoramic video image that includes the location information set by the user. The counterpart terminal may locate the object present in the object video based on the location information set to the panoramic video image transmitted from the terminal. Here, location information for displaying the object video of the counterpart terminal may be changed by the terminal or the counterpart terminal. The counterpart terminal may locate the object video input to the video call screen of the counterpart terminal to the panoramic video image based on the location information set from the terminal. Referring to FIG. 12, as the electronic device 110a and the counterpart terminal 110b share a background video, an object input to video data of the terminal 110a and video data of the counterpart terminal 110b may be present within the same space. For example, the terminal 110a and the counterpart terminal 110b may display the respective users as if they were seated at a specific table or at a specific point in a park.

Figure 14:
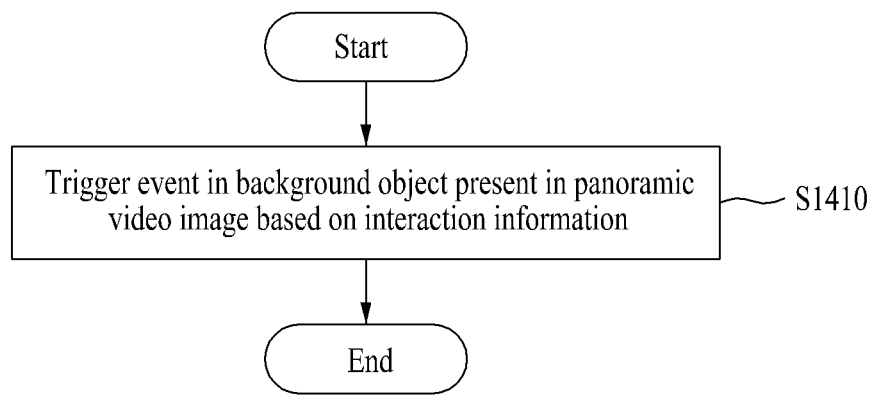
FIG. 14 is a flowchart illustrating an example of a method of triggering, by an electronic device, an event in a background video based on interaction information according to at least one example embodiment.

FIG. 14 is a flowchart illustrating an example of a method of triggering an event in a background video based on interaction information according to at least one example embodiment. Referring to FIG. 14, in operation S1410, the background video sharer 340 may trigger an event in a background object present in a panoramic video image based on interaction information. The background video sharer 340 may receive an input of interaction information from the user. Here, the interaction information may relate to triggering an event preset in the panoramic video image or a landmark in response to information input from the user. Further, the interaction information may refer to interaction with the counterpart terminal through the event triggered in the panoramic video image. The background video sharer 340 may trigger an event in response to an input of the interaction information to an item that is arranged in a partial area of the panoramic video image moving in response to motion of the terminal. For example, the background video sharer 340 may transmit, to the counterpart terminal, the panoramic video image that includes the event triggered based on the interaction information. Alternatively, the background video sharer 340 may transmit, to the counterpart terminal, only event information generated based on the interaction information. The same event information as that of the terminal may apply to a background video of the counterpart terminal. For example, if a fountain is present within the background video, the waterflow of the fountain may increase or decrease in response to an input of the interaction information, for example, a zoom-in motion and a zoom-out motion, of the user. As another example, a treasure chest may be hidden in the background video. Here, the treasure chest may be opened in such a manner that the user of the counterpart terminal may find the treasure chest and input interaction information to the treasure chest. For example, an item may be provided to the counterpart terminal in response to opening the treasure chest.

Figure 13:
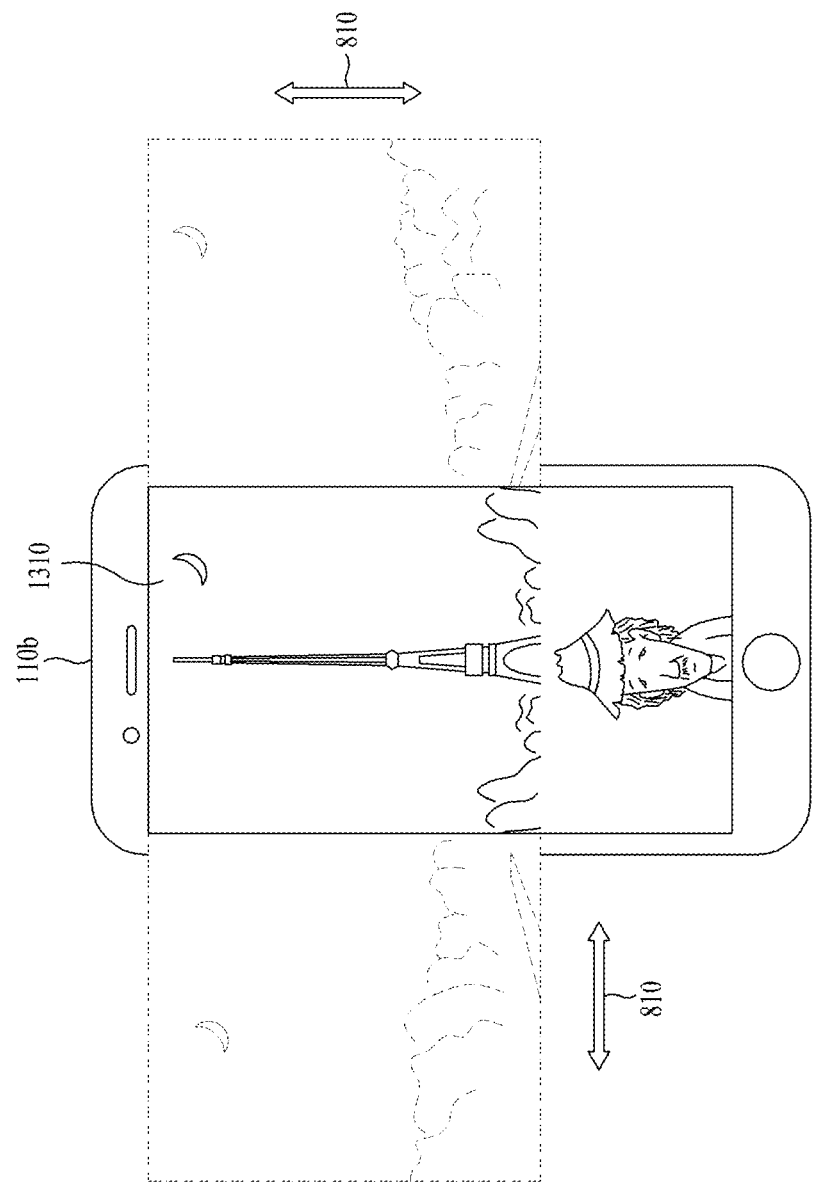
FIG. 13 illustrates an example of displaying a background video of an electronic device on a video call screen of a counterpart terminal according to at least one example embodiment.

FIG. 13 illustrates an example of displaying a background video of an electronic device on a video call screen of a counterpart terminal according to at least one example embodiment. During a video call between a terminal and a counterpart terminal 110b, the terminal and the counterpart terminal 110b may be present in the same area or may be present in different areas, respectively. For example, if the video call between the terminal and the counterpart terminal 110b is ongoing in different countries, a space in which the terminal is present may be day and a space in which the counterpart terminal 110b is present may be night. As described above, a time difference may occur between the terminal and the counterpart terminal 110b.

Here, time information at which a background video is replaced with a panoramic video image (e.g., time information indicating a time at which the original background video of the electronic device was replaced by the panoramic video image in the new video data) may be stored in the electronic device. The replacement background video of the electronic device may be transmitted to the counterpart terminal 110b. The counterpart terminal 110b may receive the replacement background video transmitted from the electronic device. At the counterpart terminal 110b, the panoramic video image of video data displayed on the video call screen of the counterpart terminal 110b may be converted based on time difference information with the terminal based on time information at which the original background video of video data displayed on the video call screen of the terminal 110a is replaced with the panoramic video image. For example, the time difference information may indicate a difference between a time at which the original background video of the electronic device (e.g., terminal 110a) was replaced with the panoramic video image and a current time at the counterpart terminal 110b when the replacement background video is received at the counterpart terminal 110b from the electronic device (e.g., terminal 110a).

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A non-transitory computer-readable recording medium storing instructions that, when executed by a processor, cause the processor to perform operations for providing a background on an electronic device, the operations comprising:
   separating an object video and an original background video from video data input to a first video call screen of an electronic device during a video call;
   generating new video data by synthesizing a panoramic video image and the object video such that the new video data includes the object video and includes the panoramic video image as a replacement background video;
   displaying, on the first video call screen, the new video data such that a location of the panoramic video image of the new video data moves in response to motion information of a user; and
   causing a second video call screen of a counterpart terminal to display the new video data displayed on the first video call screen by sharing the new video data,
   wherein the sharing includes transmitting the panoramic video image included as the replacement background video of the new video data displayed on the first video call screen to the counterpart terminal with which the video call is ongoing.

2. The non-transitory computer-readable recording medium of claim 1, wherein the sharing comprises:
   controlling the new video data including the panoramic video image as the replacement background video of the new video data to be displayed on the second video call screen of the counterpart terminal based on time information set to maintain the replacement background video.

3. The non-transitory computer-readable recording medium of claim 1, wherein the sharing comprises:
   setting, to the panoramic video image, location information for displaying an object video captured through a camera of the counterpart terminal and input to the first video call screen; and
   transmitting the panoramic video image including the set location information to the counterpart terminal.

4. The non-transitory computer-readable recording medium of claim 1, wherein the sharing comprises:
   transmitting, based on time information, the replacement background video including the time information to the counterpart terminal to cause the counterpart terminal to display the replacement background video on the second video call screen of the counterpart terminal based on time difference information indicating a difference between a time indicated by the time information and a time at which the replacement background video is received at the counterpart terminal.

5. The non-transitory computer-readable recording medium of claim 1, wherein the sharing comprises:
   triggering an event in a background object present in the panoramic video image based on interaction information.

6. The non-transitory computer-readable recording medium of claim 1, wherein the sharing comprises:
   triggering an event as an item is arranged in a partial area of the panoramic video image and interaction information is input to the item that is arranged in the partial area of the panoramic video image moving in response to motion information of the user.

7. The non-transitory computer-readable recording medium of claim 1, wherein the motion information comprises:
   orientation information about at least one of up, down, left, and right of the electronic device.

8. The non-transitory computer-readable recording medium of claim 1, wherein the displaying comprises:
   playing background music set to the panoramic video image.

9. The non-transitory computer-readable recording medium of claim 1, wherein the generating comprises:
   retrieving the panoramic video image from memory of the electronic device; and
   replacing the original background video with the panoramic video image.

10. The non-transitory computer-readable recording medium of claim 1, wherein the generating comprises:
    generating the panoramic video image by using at least one image captured by the electronic device; and
    replacing the original background video with the generated panoramic video image.

11. The non-transitory computer-readable recording medium of claim 1, wherein the generating comprises:
    providing a background video list;
    receiving a selection of the panoramic video image from the background video list; and
    replacing the original background video with the panoramic video image selected from the provided background video list.

12. A background providing method performed by an electronic device, the background providing method comprising:
    separating an object video and an original background video from video data input to a first video call screen of an electronic device during a video call;
    generating new video data by synthesizing a panoramic video image and the object video such that the new video data includes the object video and includes the panoramic video image as a replacement background video;
    displaying, on the first video call screen, the new video data such that a location of the panoramic video image of the new video data moves in response to motion information of a user; and
    causing a second video call screen of a counterpart terminal to display the new video data displayed on the first video call screen by sharing the new video data,
    wherein the sharing includes transmitting the panoramic video image included as the replacement background video of the new video data displayed on the first video call screen to the counterpart terminal with which the video call is ongoing.

13. The background providing method of claim 12, wherein the sharing comprises:
    controlling the new video data including the panoramic video image as the replacement background video of the new video data to be displayed on the second video call screen of the counterpart terminal based on time information set to maintain the replacement background video.

14. The background providing method of claim 12, wherein the sharing comprises:
    setting, to the panoramic video image, location information for displaying an object video captured through a camera of the counterpart terminal and input to the first video call screen; and transmitting the panoramic video image including the set location information to the counterpart terminal.

15. An electronic device comprising:
memory storing computer-executable instructions; and
one or more processors configured to execute the computer-executable instructions such that the electronic device is configured to perform operations including,
- separating an object video and an original background video from video data input to a first video call screen of an electronic device during a video call;
- generating new video data by synthesizing a panoramic video image and the object video such that the new video data includes the object video and includes the panoramic video image as a replacement background video;
- displaying, on the first video call screen, the new video data such that a location of the panoramic video image of the new video data moves in response to motion information of a user; and
- causing a second video call screen of a counterpart terminal to display the new video data displayed on the first video call screen by sharing the new video data,
wherein the sharing includes transmitting the panoramic video image included as the replacement background video of the new video data displayed on the first video call screen to the counterpart terminal with which the video call is ongoing.

16. The electronic device of claim 15,
wherein the transmitting includes transmitting, based on time information, the replacement background video including the time information to the counterpart terminal to cause the counterpart terminal to display the replacement background video on the second video call screen of the counterpart terminal based on time difference information indicating a difference between a time indicated by the time information and a time at which the replacement background video is received at the counterpart terminal.

17. The electronic device of claim 16, wherein the one or more processors are configured to execute the computer-executable instructions such that the electronic device is further configured to set whether the counterpart terminal is to receive the panoramic video image.

18. The electronic device of claim 16, wherein a background video of video data input through a camera of the counterpart terminal is replaced with the received panoramic video and the background video of the video data input through the camera of the counterpart terminal replaced with the panoramic video image is displayed on the second video call screen of the counterpart terminal.

* * * * *